United States Patent [19]

Holtermann

[11] Patent Number: 4,944,487
[45] Date of Patent: Jul. 31, 1990

[54] DIAPHRAGM VALVE

[75] Inventor: Ludwig K. Holtermann, Old Saybrook, Conn.

[73] Assignee: Lee Company, Westbrook, Conn.

[21] Appl. No.: 349,392

[22] Filed: May 8, 1989

[51] Int. Cl.[5] .......................... F16K 31/06; F16K 7/14
[52] U.S. Cl. ................................ 251/129.17; 251/331
[58] Field of Search .................... 251/129.17, 331, 61.1

[56] References Cited

U.S. PATENT DOCUMENTS

| | | | |
|---|---|---|---|
| 3,246,872 | 4/1966 | Seltsam | 251/331 |
| 4,304,260 | 12/1981 | Turner et al. | 251/331 X |
| 4,614,328 | 9/1986 | Zeadman et al. | 251/129.17 |
| 4,819,691 | 4/1989 | Lofgren et al. | 251/331 X |

Primary Examiner—Arnold Rosenthal

[57] ABSTRACT

A bidirectional diaphragm valve is presented in which the flat, disk shaped diaphragm formed of elastomeric material is biased against the valve seat by means of a plunger which is not attached to the diaphragm. The diaphragm is clamped between the valve body and a bonnet member providing compression and confinement of the perimeter of the diaphragm, resulting in radial compression of the diaphragm which is expressed inwardly as the expansion and buckling of the central portion of the diaphragm whereby the valve opens passively in response to pressure from the flow medium when the plunger is retracted. The preferred embodiment of the valve is of miniature size and compact configuration adapted for use in multi-valve banks and all parts having wetted surfaces are formed of materials of suitable chemical inertness compatible with the fluid media.

21 Claims, 5 Drawing Sheets

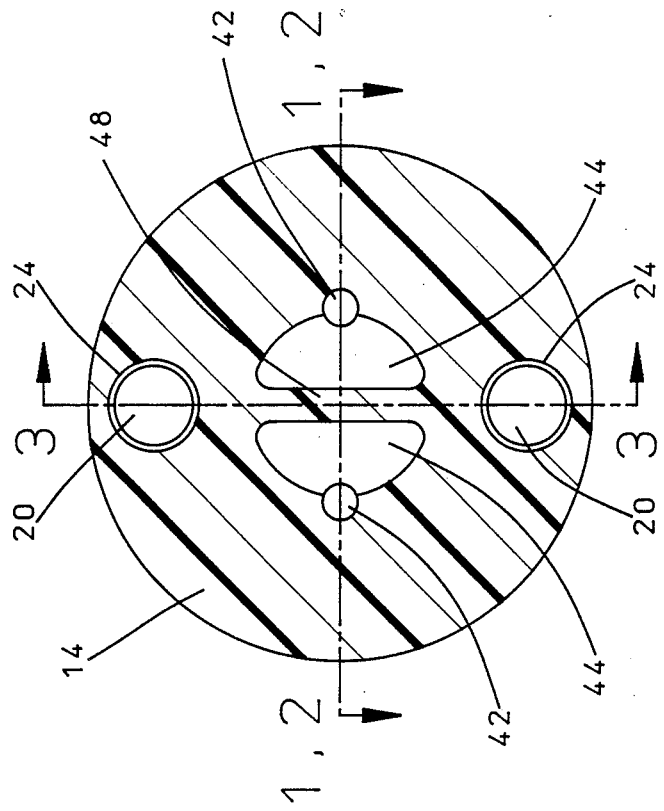

DIAPHRAGM VALVE

BACKGROUND OF THE INVENTION

A. Field of Invention

The present invention relates generally to diaphragm valves and more particularly to diaphragm valves used to control flows of fluids that are chemically aggressive and corrosive or that are required to be free of contamination caused by reaction with valve materials.

B. Description of Related art

Diaphragm valves are available for controlling the flow of fluid media including chemically aggressive and corrosive fluids. The general design and operation of diaphragm valves can be seen in U.S. Pat. No. 3,349,795, U.S. Pat. No. 4,596,268, U.S. Pat. No. 3,628,770 and U.S. Pat. No. 4,609,178. Of the mentioned valves all except U.S. Pat. No. 4,609,178 are symmetrical thereby providing for functioning independent of the direction of the flow of the fluid media. Of the bidirectional diaphragm valves only the valve described in U.S. Pat. No. 4,596,268 entitled "Diaphragm Valves For Corrosive Liquids" is specifically adapted for the control of corrosive fluid media but all operate in essentially the same manner. Such valves generally function by providing a flexible diaphragm which is attached to a plunger or other means such that the diaphragm is biased toward a valve seat closing the flow passage and thereby impeding flow. For example, in the valve described in U.S. Pat. No. 4,596,268, the biasing means is attached to the diaphragm by means of a bolt or other attaching device which is imbedded in or integrally molded to a backing diaphragm as well as a sheet of inert material covering the surface exposed to the fluid media. The diaphragm in U.S. Pat. No. 4,596,268 is thus repeatedly subjected to opposing forces at the point of attachment of the biasing means as well as radial tension and flexion caused by the forcible operation of the biasing means when opening and closing the valve.

A number of other valve devices have been advanced for the control of corrosive fluids without using the means of a flexible diaphragm, for example, U.S. Pat. No. 4,260,130 U.S. Pat. No. 4,580,593 U.S. Pat. No. 4,214,730 and U.S. Pat. No. 4,399,834. The functional characteristics and sealing mechanics of these valves is entirely dissimilar from the characteristics of the diaphragm valve advanced herein.

When a diaphragm valve is used to control the flow of chemically aggressive fluids, the entire wetted surface of the valve, including the diaphragm, must be made of corrosion resistant material to avoid deterioration. Similarly, when such a valve is used to control the flow of fluids that are sensitive to contamination such as in medical or scientific applications, inert materials must be used in the manufacture of the valve body and diaphragm.

Currently available materials suitable for use in the diaphragm under such conditions include, elastomeric polytetrafluoroethylene (PTFE) substances. A diaphragm which is shaped or molded of these materials to provide for the attachment of a biasing means is more expensive than a simple disc cut or stamped from sheet stock. In addition, a diaphragm adapted to attachment to a biasing means is difficult to install or replace, particularly in miniature applications required in systems handling minute quantities of reagents, substrate and other fluid media, particularly such systems being developed in medical, biochemical and biotechnical fields.

As illustrated by the requirement of a backing diaphragm to provide support for the inert diaphragm shown in U.S. Pat. No. 4,596,268, the characteristic forcible opening and closing of a conventional diaphragm valve can cause diaphragm failure particularly when the components are selected for their chemically inert characteristics rather than their mechanical properties. The available inert materials are also known to take a compression set when forcibly deformed as in the conventional valve.

The existing diaphragm valves are designed for installation in a straight run of piping so that the inlet and outlet valves extend along the same line but opening in opposite directions, a configuration which, among other things, creates difficulties in constructing a bank of multiple control valves in a compact configuration. Such valves also characteristically use a valve seat of a width that is approximately equal to the diameter of the flow passage in general. In applications where flow capacity restriction is undesirable, for the area of a transverse section of the flow passage to remain relatively constant over the valve seat when the valve is open, the portion of the diaphragm engaging the valve seat must travel a distance approximating the diameter of the flow passage in general.

SUMMARY OF THE INVENTION

The invention herein described comprises a diaphragm valve wherein there is no point of attachment between the diaphragm and the biasing means employed to press the diaphragm against the valve seat. The diaphragm comprises a flat disk of elastomeric material typically cut from sheet stock at considerable cost savings compared to a diaphragm molded to allow for attachment of the biasing means. The valve is closed by means of a plunger biasing the diaphragm against the valve seat and the valve opens passively in response to the retraction of the plunger and the presence of a minimal pressure from the flow medium.

The passive operation of the valve is the result of radial compression of the diaphragm which causes the diaphragm to buckle. The pressure from the flow medium acting on the relatively large surface of the diaphragm urges the diaphragm to buckle away from the valve seat. In this manner the valve opens passively under low pressure conditions. Although the valve ordinarily would not open passively when a vacuum exists in the flow passage, the presence of pressure as low as one p.s.i. (pounds per square inch) is sufficient to open the valve in its preferred embodiment.

The radial compression of the diaphragm can be achieved by means of confining the disk about its perimeter and compressing the planar surfaces around its edge. The compression of the diaphragm edge causes radial compression of the diaphragm which is expressed inwardly due to the simultaneous confinement of the rim of the diaphragm. The characteristic buckling of the diaphragm assists in opening the valve by helping to counteract the tendency of the diaphragm to take a compression set or stick to the valve seat.

In a preferred embodiment, the diaphragm is formed of chemically inert elastomer and is clamped between the valve body and a valve bonnet which also defines a plunger blade guide. The valve body is formed of any suitably inert substance and with the bonnet is adapted for the compression and confinement of the perimeter of the diaphragm between the valve body and bonnet surfaces. The valve body comprises a flat, straight valve seat which is perpendicular to the direction of the flow and separates flow passages defined by the valve body. The valve body is further characterized by bi-lateral symmetry such that the flow passages are similarly configured, allowing for bidirectional flow paths. The internal shape of the flow passages may be varied according to desired flow characteristics, and in the preferred embodiment are such that the length of the valve seat is 5–6 times the inside diameter of the inlet-outlet ports. The valve therefore opens with a relatively short stroke and a minimal axial displacement of the diaphragm opens the valve. The bonnet also houses a means for retractably biasing the plunger blade. The valve bonnet is removably attached to the valve body by means of screws which allow ease of assembly and disassembly for replacement of the diaphragm and also serve to align and orient the valve seat and the plunger blade guide so that the valve seals with a line contact. The surface of the valve seat is flat while the edges of the plunger blade that contact the diaphragm are rounded to prevent cutting or scoring the diaphragm.

In the preferred embodiment, the flow passages communicate with input-output ports at one end of the valve and the biasing means for the plunger blade as well as the means for controlling the biasing means are housed in the other end of the valve. This configuration allows the compact assembly of multi-valve banks with fluid connectors on one side and control means on the other side. To further facilitate assembly of multiple valve systems, a portion of the bonnet has a squared exterior and is adapted to accommodate various mounting devices.

While the illustrated preferred embodiment is designed and constructed for miniature applications wherein all wetted surfaces are required to be as chemically inert as possible, it is presumed that the valve would perform similarly in a variety of sizes and when constructed of a variety of materials. Suitable materials for the valve body, diaphragm, and bonnet would vary depending upon the characteristics of the fluid medium and other requirements of particular applications. The mechanical functioning of the valve depends upon the elastomeric properties of the diaphragm rather than the chemical reactivity of the diaphragm material. Similarly, although a solenoid with returning spring is used in the preferred embodiment as the means for retractably biasing the plunger blade, other means such as manual, spring, or pneumatic means could be used to perform this function. Additionally, although the preferred embodiment illustrated in the Drawings uses a spring to close the valve and a solenoid driven plunger to open the valve, these can be reversed so that the valve is normally held open by a spring and closed by activation of the solenoid. The valve bonnet, and valve body may be attached by any suitable means, either permanently or detachably. The portion of the valve bonnet that houses the biasing means may be integrally formed with the plunger blade guiding portion of the valve bonnet or may be detachably joined therewith.

An important object of the invention is to provide a relatively inexpensive valve wherein all wetted surfaces are compatible with chemically aggressive fluid media.

Another object of the invention is to provide a diaphragm valve with inlet/outlet ports facing in the same direction and adjacent to each other.

A further object of the invention is to provide a diaphragm control valve which operates with a relatively short stroke or axial displacement of the diaphragm.

A yet further object of the invention is to provide a diaphragm valve capable of economical manufacture, assembly and repair in miniature applications.

These and other features, advantages, uses and objects of this invention will be apparent from the following drawings and detailed description of a preferred embodiment of this invention.

BRIEF DESCRIPTION OF THE DRAWINGS

FIG. 5 is a cross sectional view of the valve body portion of the valve of FIG. 1 taken along line C—C shown in said FIG. 1.

DESCRIPTION OF THE PREFERRED EMBODIMENT

Figure 1:
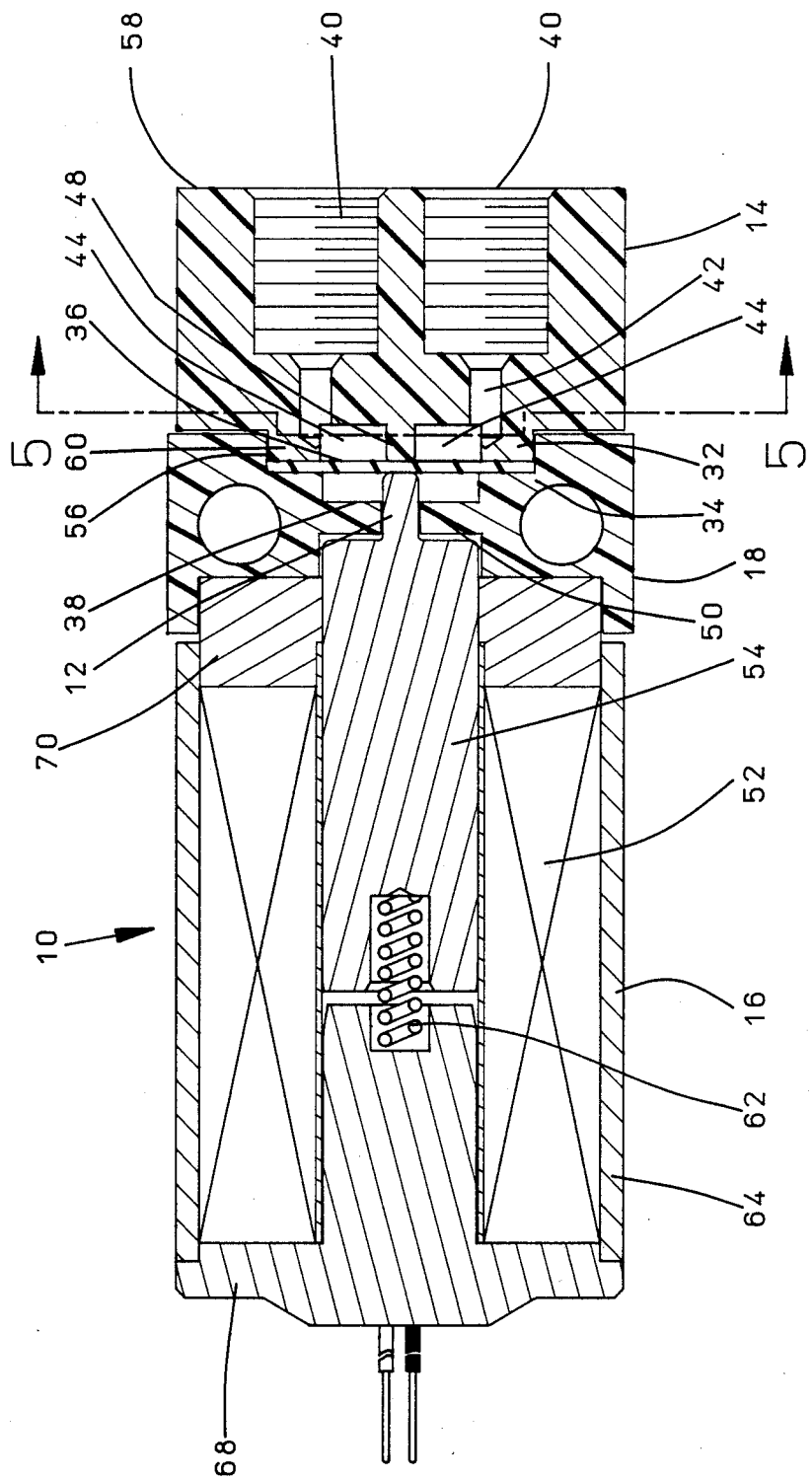
FIG. 1 is an axial section view of a diaphragm valve in accordance with the present invention taken along line A—A shown in FIG. 5, said valve being illustrated in the closed position.

With reference to the drawings wherein like numerals present like parts throughout the figures, a preferred embodiment of the diaphragm valve in accordance with the present invention is illustrated and is generally designated in FIG. 1 by the numeral 10. The diaphragm valve 10 is especially adapted for the control of the flow of fluid media, particularly fluids that are highly chemically aggressive and corrosive and fluids that are sensitive to contamination by reaction with system components. The diaphragm valve 10 is preferably of a compact miniaturized form and size and may be combined with other similar valves in a multi-valve bank. Although size and capacity is not critical to the operation of diaphragm valve 10, the benefits of the illustrated embodiment are more evident and useful in miniature sizes such as where the total length of the diaphragm valve 10 is about 1.25 inches, the width is about 0.5 inches and the inside diameter of the flow passage where tubular is about 0.032 inches. Since the general flow passage defined by diaphragm valve 10 is of symmetrical design, the flow path may be in either direction.

The diaphragm valve 10 generally comprises a valve body 14, a bonnet member 18, a flexible diaphragm 36, and a plunger 54 within a housing 16. Housing 16 is generally cylindrical comprising a cylindrical shell 64 with a retaining member 68 at one end and an annular guide member 70 at the other end. The bonnet member 18 is positioned between the valve body 14 and the guide member 70 of housing 16 and the diaphragm is retained between the bonnet member 18 and the valve body 14. The components are held in place by screws 20 extending through valve body screw bores 24 traversing the valve body 14, and bonnet member screw bores 26 traversing the bonnet member 18, and engaging threaded bores 28 in the guide member 70 of housing 16.

The valve body has an input-output end 58 and a valve seat end 60. Two input/output ports 40 are formed in the input-output end 58 of the valve body 14 and are adapted as fitting bosses to receive tubing coupling fittings. Each input-output port 40 communicates with one of two flow passages 42 both of which are formed by and within the valve body 14 and extend to one of two valve chambers 44 defined by the valve body 14 at the valve seat end 60. In the preferred embodiment illustrated in FIG. 5, the valve chambers 44 are generally semi-circular in transverse section having a flattened side formed of the valve seat 48. The end of the valve chambers 44 opposite the aperture through which the flow passages 42 communicate with the valve chambers 44 comprises a semi-circular aperture in the surface of the valve seat end 60. The valve chambers 44 have greater transverse area and internal capacity than the inlet-outlet ports 40. The central portion of the surface of valve seat end 60 is raised and forms the valve seat 48 and the valve chambers 44 which are radially surrounded by an annular flange 32. Annular flange 32 is formed by the surface of the valve seat end 60 of the valve body 14 in the same plane as the surface of valve seat 48, and perpendicular to the axis of the flow passages 42 and of the valve 10 in general, and radially surrounding both of the valve chambers 44 as well as the valve seat 48. An opposing annular flange 34 is formed in the opposing surface of the bonnet member 18 and the flanges 32 and 34 hold in place and compress the peripheral surfaces of the diaphragm 36. Opposing flange 34 is recessed in the surface of the bonnet member 18 facing the valve body 14 such that a cylindrical shoulder 56 is formed immediately adjacent to flange 34 and concentric with both flanges 32 and 34. The shoulder 56 confines the outside edge of diaphragm 36 preventing the radial expansion of the diaphragm 36 upon compression between flanges 32 and 34.

The valve seat 48 is flat, straight and extends completely across and separates the valve chambers 44. The valve seat 48 is slightly wider than the contact surface of the plunger blade 12 and allows the diaphragm 36 to seal to the valve seat 48 with a line contact. The length of the valve seat 48 is 4–6 times the inside diameter of the flow passages 42 which is usually equivalent to the inside diameter of the tubing to which the diaphragm valve 10 is connected. As a result of the relative width of the valve seat 48 compared to the bore of the flow passages 42, the diaphragm 36 need only be axially displaced a short distance from valve seat 48 to open the diaphragm valve 10 without restricting the flow of the fluid medium through the valve 10 by constricting the internal dimensions of the flow path. This short stroke provides benefits in decreased response time as well as decreased fatigue of the diaphragm.

Figure 2:
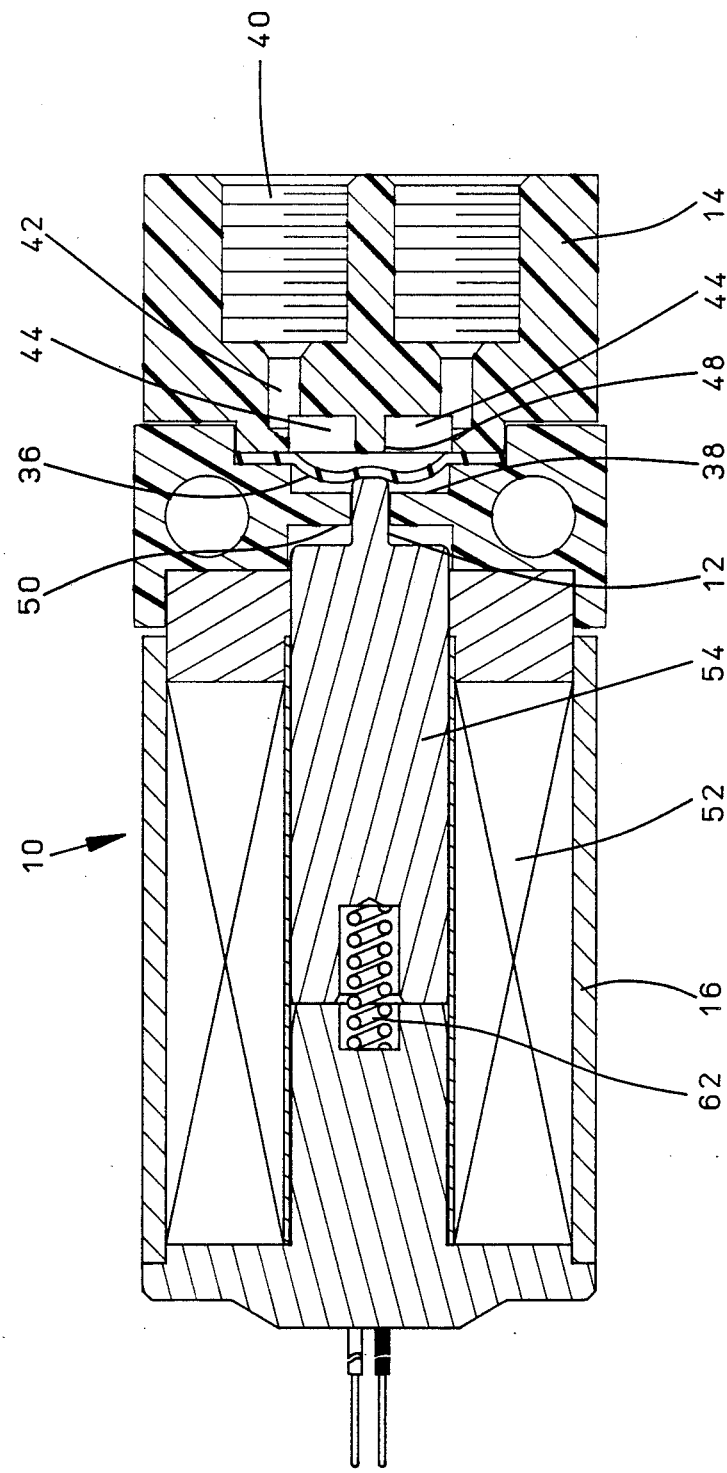
FIG. 2 is the same axial section view as FIG. 1, said valve, however here being illustrated in the open position.
Figure 3:
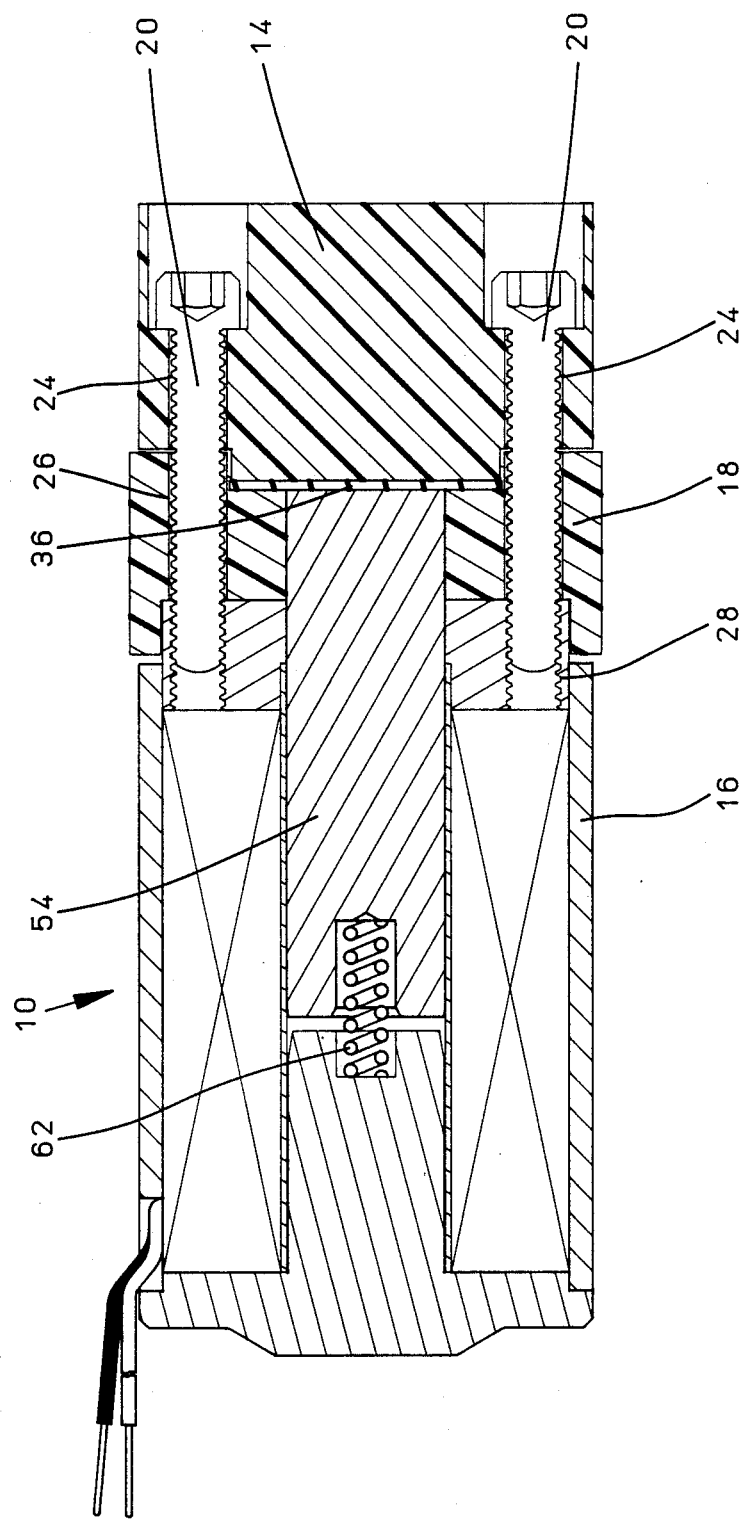
FIG. 3 is an axial section view of the valve of FIG. 1 taken alone line B—B shown in FIG. 5 whereby the plane of the illustrated section is rotated 90° about the longitudinal axis of said valve.
Figure 4:
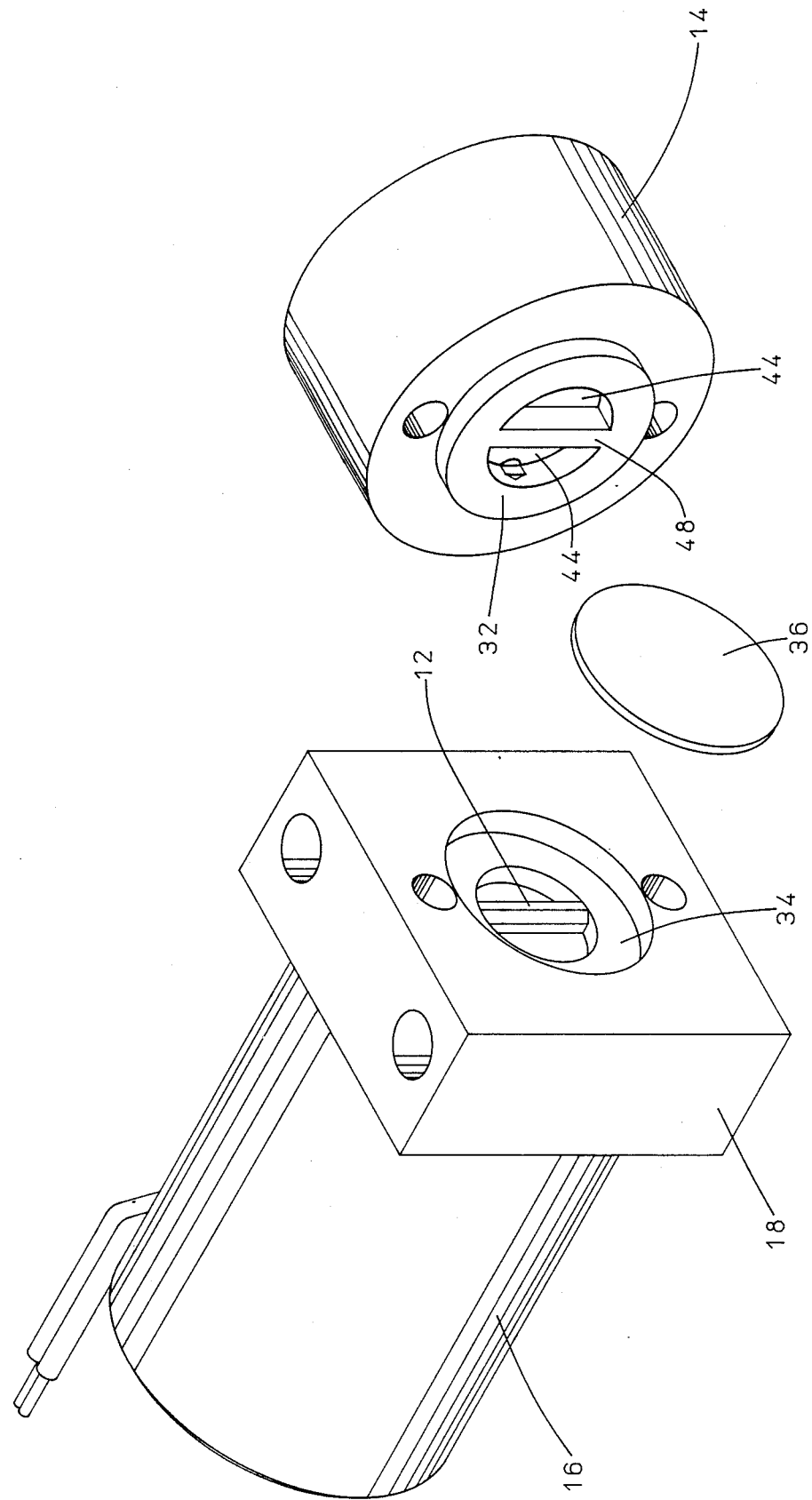
FIG. 4 is a side view of the valve of FIG. 1 wherein the components are disassembled.

When the diaphragm valve 10 is open, as shown in FIG. 2, the fluid medium enters the valve 10 via one input-output port 40, flows into one flow passage 42 and thence into one of the valve chambers 44, passes between the valve seat 48 and diaphragm 36 and then enters the other valve chamber 44 and thence the other flow passage 42 and exits the valve 10 via the other input-output port 40. When the diaphragm valve 10 is closed, as shown in FIG. 1, the fluid medium can not pass between the valve seat 48 and diaphragm 36 and flow through the valve 10 is prevented.

When the diaphragm valve 10 is assembled, tightening the screws 20 results in the axial compression of the periphery of diaphragm 36 and since shoulder 56 prevents diaphragm 36 from expanding radially outwardly, the resulting radial compression of the diaphragm 36 is expressed by a buckling, axial deformation of the unrestrained center of diaphragm 36. The central portion of the surface 38 of the bonnet member 18 is axially recessed away from the diaphragm 36 to allow the diaphragm 36 to axially deform upon retraction of plunger 54. In the relatively low pressure applications (0–25 p.s.i.) for which the illustrated embodiment was designed, surface 38 need not be adapted to provide support for the diaphragm 36. At higher pressure ranges, however, surface 38 would be contoured to provide a physical limit of the maximum deformation of the diaphragm 36 thereby preventing failure due to excessive pressure from the fluid medium.

A plunger 54 includes a plunger blade 12 which is restrained and guided by a blade guide 50 formed and defined by a slot in the surface 38 of the bonnet member 18. The plunger blade 12 is slidably received within the blade guide 50 and is aligned with the valve seat 48. The plunger 54 is axially slidably received by a central cylindrical cavity co-axial with, defined by and radially surrounded by a solenoid coil 52 and by guide member 70. Both solenoid coil 52 and by guide member 70 are mounted within the cylindrical shell 64 of housing 16 A spring 62 compressed between the plunger 54 and a plunger stop 68 fixedly mounted within the housing 16 operates to bias the plunger 54 against the diaphragm 36 and thereby allow the diaphragm valve 10 to remain closed in the absence of the activation of the solenoid coil 52. Plunger 54 is formed of appropriate materials such that the activation of the solenoid coil 5 by causing electrical current to pass therethrough causes the plunger 54 to further compress spring 62 and slidingly retract away from the diaphragm 36 thereby allowing diaphragm 36 to disengage from the valve seat 48 and axially deform, opening the valve 10. Absent activation of solenoid coil 52, spring 62 causes plunger blade 12 to press the diaphragm 36 against the valve seat 48 to interrupt the flow of fluid between the valve chambers 44 and thus between input/output ports 40.

The diaphragm 36 comprises a flat, circular disk of sheet stock of an elastomeric polytetrafluoroethylene (PTFE), such as that sold under the Trademarks "Kalrez" manufactured by E. I. du Pont de Nemours and Company, Willmington, Del. or "Chemraz" manufactured by Greene, Tweed & Co., Inc., Kulpsville, Pa. Although other elastomeric sheet stock is also suitable material for the diaphragm, the indicated materials are selected in the preferred embodiment for their chemically inert properties. It is understood that other suitably elastomeric materials can be used for the diaphragm 36 provided their chemical characteristics are compatible with the desired fluid media and applications contemplated.

The valve body 14 may be formed of a wide variety of alternative materials of suitable tensile strength and hardness provided they are chemically compatible with the flow medium. In the experimental models of the illustrated embodiment, the valve body 14 is formed of CTFE (chlorotrifluoroethylene) manufactured by the Minnesota Mining and Manufacturing Company and sold under the Trademark "Kel-F". It should be understood and anticipated that alternatively, the valve body 14 may be formed of a thermotropic liquid crystal polymer sold by Celanese under the Trademark "Vectra" and that a number of fluoropolymer materials can be utilized for the valve body 14.

Although the screws 20 are the preferred means of attachment for ease of manufacture, assembly and disassembly, the housing 16, bonnet member 18 and valve body 14 can be held in place and joined by other suitable means provided adequate compression of diaphragm 36 is achieved. The function of aligning the blade guide 50 with the valve seat 48 is accomplished in the preferred embodiment by the insertion of the screws 20 into and through the screw bores 24 and 26 and the engagement of the screws 20 within the threaded bores 28. It is understood that alignment could also be accomplished by notching or other similar means.

The radial compression of the diaphragm 36 can be alternatively achieved, enhanced or modified by the method of forming the diaphragm 36 in the shape of a disk that has a diameter greater than inside diameter of the shoulder 56.

In addition, it is understood that the bonnet member 18 could be integrally formed with the housing 16 without changing the functional characteristics of the diaphragm valve 10. The removable attachment of the bonnet member 18 is used for ease of manufacture, assembly and repair.

In the preferred embodiment illustrated herein, the plunger 54 is driven by a spring 62 and retracted by a solenoid 52 but a plunger could also be driven pneumatically, manually, mechanically or by a solenoid. Accordingly, while the illustrated preferred embodiment is designed to be closed in the absence of an electrical current that opens the valve 10, the plunger could be mechanically biased toward the open position such that the valve 10 would be open unless closed by an electrical current.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A diaphragm valve comprising:
   A. valve body means defining a first flow passage, a second flow passage and a valve seat means between the first and second flow passages;
   B. diaphragm means comprised of an elastomeric material sealingly engageable with the valve seat means to prevent passage of fluid between the first and second flow passages;
   C. retractable means for releasably biasing the diaphragm means against the valve seat means to sealingly engage therewith and control the flow of fluid through the valve; and
   D. means for subjecting the diaphragm means to radial compression sufficient to cause the diaphragm means to disengage from the valve seat means when the biasing means is retracted.

2. A diaphragm valve according to claim 1 wherein the diaphragm compression means comprises a first flange defined by the valve body means and a bonnet member comprising a second opposing flange formed to confine and compress the rim of the diaphragm means between the first and second flanges upon the compressible attachment of the bonnet member to the valve body means, preventing outward expansion and causing radial compression of the diaphragm means sufficient to cause the central portion of the diaphragm means to deform and to disengage from the valve seat, means when the biasing means is retracted.

3. A diaphragm valve according to claim 2 wherein the biasing means comprises a plunger blade adapted to cause a line seal between the diaphragm means and the valve seat means and wherein the bonnet member defines a slot for guiding and aligning the plunger blade.

4. A diaphragm valve according to claim 3 wherein the length of the valve seat means is about 4–6 times greater than the inside diameter of the minimum bore of the first or second flow passages and the minimum inside bore of the first and second flow passages is about 0.032 inches.

5. A diaphragm valve according to claim 4 wherein the valve body means further comprises and defines a plurality of inlet-outlet ports each of which ports communicate between one of the flow passages and the fluid system in which the valve is installed, being adapted to receive tubular connectors.

6. A diaphragm valve according to claim 4 wherein the biasing means further comprises a spring for driving the plunger blade against the diaphragm means and a solenoid for retracting the plunger blade away from the diaphragm means.

7. A diaphragm valve according to claim 6 wherein the biasing means further comprises a solenoid for driving the plunger blade against the diaphragm means and a spring for retracting the plunger blade away from the diaphragm means.

8. A diaphragm valve according to claim 4 wherein the bonnet member is compressibly and removably attached to the valve body by means of screws.

9. A diaphragm valve comprising:
   A. valve body means formed of a relatively chemically inert material defining a first flow passage, a second flow passage and valve seat means between the first and second flow passages;
   B. diaphragm means comprised of a relatively chemically inert elastomeric material sealingly engageable with the valve seat to prevent passage of fluid between the first and second flow passages;
   C. retractable biasing means for releasably biasing the diaphragm means against the valve seat means to sealingly engage therewith and control the flow of fluid through the valve; and
   D. means for subjecting the diaphragm means to radial compression sufficient to cause the diaphragm means to disengage from the valve seat means when the biasing means is retracted.

10. A diaphragm valve according to claim 9 wherein the diaphragm compressing means comprises a first flange defined by the valve body means and a bonnet member comprising a second opposing flange formed to confine and compress the rim of the diaphragm means between the first and second flanges upon the compressible attachment of the bonnet member to the valve body means, preventing outward expansion and causing radial compression of the diaphragm means sufficient to cause the central portion of the diaphragm means to deform and to disengage from the valve seat means when the biasing means is retracted.

11. A diaphragm valve according to claim 10 wherein the biasing means comprises a plunger blade adapted to cause a line seal between the diaphragm means and the valve seat means and wherein the bonnet member defines a slot for guiding and aligning the plunger blade.

12. A diaphragm valve according to claim 10 wherein the length of the valve seat means is about 4–6 times greater than the inside diameter of the minimum bore of the first or second flow passages and the minimum inside bore of the first and second flow passages is about 0.032 inches.

13. A diaphragm valve according to claim 12 wherein the chemically inert material of the diaphragm means is elastomeric polytetrafluoroethylene.

14. A diaphragm valve according to claim 13 wherein the chemically inert material of the valve body means is selected from a group consisting essentially of polytetrafluoroethylene, chlorotrifluoroethylene, and thermotropic liquid crystal polymers.

15. A diaphragm valve according to claim 14 wherein the valve body means further comprises and defines a plurality of inlet-outlet ports each of which ports communicate between one of the flow passages and the fluid system in which the valve is installed, being adapted to receive tubular connectors.

16. A diaphragm valve according to claim 14 wherein the biasing means further comprises a spring for driving the plunger blade against the diaphragm means and a solenoid for retracting the plunger blade away from the diaphragm means.

17. A diaphragm valve according to claim 14 wherein the bonnet member is compressibly and removably attached to the valve body by means of screws.

18. A diaphragm valve according to claim 14 wherein the biasing means further comprises a solenoid for driving the plunger blade against the diaphragm means and a spring for retracting the plunger blade away from the diaphragm means.

19. The method of controlling the flow of a fluid media through a fluid system comprising
    A. connecting a diaphragm valve comprising valve body means defining a first flow passage, a second flow passage and a valve seat means between the first and second flow passages, diaphragm means comprised of an elastomeric material sealingly engageable with the valve seat means to prevent passage of fluid between the first and second flow passages, retractable means for releasably biasing the diaphragm means against the valve seat means to sealingly engage therewith and control the flow of fluid through the valve, and means for subjecting the diaphragm means to radial compression sufficient to cause the diaphragm means to disengage from the valve seat means when the biasing means is retracted, to the fluid conduit of a fluid system,
    B. opening the valve to allow flow through the valve and release the pressure differential across the valve as the operation of the system requires, and
    C. closing the valve to prevent flow through the valve as the operation of the system requires.

20. The method of controlling the flow of a fluid media through a fluid system comprising
    A. connecting a diaphragm valve comprising valve body means defining a first flow passage, a second flow passage and a valve seat means between the first and second flow passages, diaphragm means comprised of an elastomeric material sealingly engageable with the valve seat means to prevent passage of fluid between the first and second flow passages, retractable means for releasably biasing the diaphragm means against the valve seat means comprising a plunger blade adapted to cause a line seal between the diaphragm means and the valve seat means to sealingly engage therewith and control the flow of fluid through the valve, a spring for driving the plunger blade against the diaphragm means and a solenoid for retracting the plunger blade away from the diaphragm means, and means for subjecting the diaphragm means to radial compression sufficient to cause the diaphragm means to disengage from the valve seat means when the biasing means is retracted, to the fluid conduit of a fluid system,
    B. causing electrical current to pass through the solenoid sufficient to open the valve to allow flow through the valve and release the pressure differential across the valve as the operation of the system requires, and
    C. discontinuing the passage of electrical current through the valve allowing the valve to close and prevent flow through the valve as the operation of the system requires.

21. The method of controlling the flow of a fluid media through a fluid system comprising
    A. connecting a diaphragm valve comprising valve body means defining a first flow passage, a second flow passage and a valve seat means between the first and second flow passages, diaphragm means comprised of an elastomeric material sealingly engageable with the valve seat means to prevent passage of fluid between the first and second flow passages, retractable means for releasably biasing the diaphragm means against the valve seat means comprising a plunger blade adapted to cause a line seal between the diaphragm means and the valve seat means to sealingly engage therewith and control the flow of fluid through the valve, a solenoid for driving the plunger blade against the diaphragm means and a spring for retracting the plunger blade away from the diaphragm means, and means for subjecting the diaphragm means to radial compression sufficient to cause the diaphragm means to disengage from the valve seat means when the biasing means is retracted, to the fluid conduit of a fluid system,
    B. causing electrical current to pass through the solenoid sufficient to close the valve and prevent flow through the valve as the operation of the system requires, and
    C. discontinuing the passage of electrical current through the valve allowing the valve to open to allow flow through the valve and release the pressure differential across the valve as the operation of the system requires.

* * * * *